United States Patent
Cohen et al.

(10) Patent No.: US 9,342,727 B2
(45) Date of Patent: May 17, 2016

(54) FIELD SHAPING CHANNELS IN A SUBSTRATE ABOVE A BIOMETRIC SENSING DEVICE

(71) Applicant: APPLE INC., Cupertino, CA (US)

(72) Inventors: Sawyer I. Cohen, Sunnyvale, CA (US); Scott A. Myers, Palo Alto, CA (US); Dale N. Memering, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 33 days.

(21) Appl. No.: 14/196,832

(22) Filed: Mar. 4, 2014

(65) Prior Publication Data

US 2015/0254490 A1    Sep. 10, 2015

(51) Int. Cl.
*G06K 9/00* (2006.01)
(52) U.S. Cl.
CPC .......... *G06K 9/0002* (2013.01); *G06K 9/00053* (2013.01)
(58) Field of Classification Search
CPC ............. H01L 23/5384; G06K 9/0002; G06K 9/00053
See application file for complete search history.

(56) References Cited

U.S. PATENT DOCUMENTS

| | | | |
|---|---|---|---|
| 6,088,471 A † | 7/2000 | Setlak | |
| 8,363,028 B2 | 1/2013 | Antaki | |
| 8,487,624 B2 | 7/2013 | Bredholt et al. | |
| 8,570,303 B2 * | 10/2013 | Chen | 345/175 |
| 8,797,298 B2 * | 8/2014 | Brosnan et al. | 345/176 |
| 2003/0107097 A1 * | 6/2003 | McArthur | G06K 9/00053 257/414 |
| 2011/0215341 A1 * | 9/2011 | Bond | H01L 33/58 257/81 |
| 2011/0248405 A1 | 10/2011 | Li et al. | |
| 2012/0106117 A1 * | 5/2012 | Sundaram et al. | 361/808 |
| 2013/0201153 A1 † | 8/2013 | Schneider | |
| 2013/0293482 A1 | 11/2013 | Burns et al. | |
| 2014/0241595 A1 † | 8/2014 | Bernstein | |

FOREIGN PATENT DOCUMENTS

| | | |
|---|---|---|
| EP | 0942259 | 9/1999 |
| EP | 1316913 | 6/2003 |
| TW | M438642 | 10/2012 |
| WO | WO03049012 | 6/2003 |

OTHER PUBLICATIONS

International Search Report and Written Opinion, PCT/US2015/015531, filed Feb. 12, 2015, 12 pages.
Shorey et al., "Development of Substrates Featuring Through Glass Vias (TGV) for 3D-IC Integration," Corning Incorporated, 2012.

* cited by examiner
† cited by third party

*Primary Examiner* — Gregory M Desire
(74) *Attorney, Agent, or Firm* — Brownstein Hyatt Farber Schreck, LLP (57) ABSTRACT

An electronic device may include a biometric sensing device that has a sensing area, and a substrate positioned above the sensing area and/or the biometric sensing device. The substrate can include vias that are formed through at least a portion of the substrate. The vias can be positioned at least above the sensing area of the biometric sensing device. The vias may be filled with a conductive material or a dielectric material. Alternatively, some vias can be filled with a conductive material while other vias are filled with a non-conductive or dielectric material.

25 Claims, 6 Drawing Sheets

FIELD SHAPING CHANNELS IN A SUBSTRATE ABOVE A BIOMETRIC SENSING DEVICE

TECHNICAL FIELD

The present invention relates generally to biometric sensing devices, and more particularly to field shaping channels formed in a substrate located above a biometric sensing device.

BACKGROUND

Biometric sensing devices are increasingly common in computer or network security applications, financial applications, and surveillance applications. Biometric sensing devices detect or image a unique physical or behavioral trait of a person, providing biometric data that can reliably identify the person. For example, a fingerprint includes a unique pattern of ridges and valleys that can be imaged by a fingerprint sensing device. The image of the fingerprint, or the unique characteristics of the fingerprint, can be compared to reference data, such as a reference fingerprint image. The identity of the person is obtained or verified when the newly captured fingerprint image matches the reference fingerprint image.

A cover glass or substrate may be positioned above a biometric sensing device to act as an input surface for the biometric sensing device, or to protect the biometric sensing device from damage and environmental conditions. In some instances, the substrate material or the thickness of the substrate can adversely impact the performance of the biometric sensing device. For example, an image captured by a biometric sensing device may be blurry due to the sensed fields dispersing or spreading out as the sensed fields pass through the substrate. It can be difficult to resolve details or features in the image because the thickness of the substrate limits the resolution of a captured image.

SUMMARY

Embodiments described herein provide a substrate that has one or more vias formed therein, and the vias are filled with a material that directs the sensed fields to or towards a sensing area of a biometric sensing device that is positioned below the substrate. The sensed fields can be electric fields, magnetic fields, light, heat, and other types of property that can be sensed by a biometric sensing device. In one aspect, an electronic device may include a biometric sensing device that has a sensing area, and a substrate positioned above the biometric sensing device and/or the sensing area. The substrate can include vias that are formed through at least a portion of the substrate. The vias can be positioned at least above the sensing area of the biometric sensing device. The vias may be filled with a conductive material, a dielectric material, or some vias can be filled with a conductive material while other vias are filled with a non-conductive or dielectric material.

In one embodiment, the biometric sensing device is a fingerprint sensing device. The fingerprint sensing device may have a sensing die that includes one or more sensing elements that form a sensing area. As one example, the sensing elements can be capacitive sensing elements. A substrate is positioned above the sensing die and includes vias formed through at least a portion of the substrate. One or more of the vias may be filled with a conductive material and/or with a non-conductive or dielectric material. In some embodiments, the vias may be arranged substantially perpendicular to a top surface of the sensing area.

In another aspect, a method for constructing a biometric sensing device can include positioning a substrate above a sensing area of the biometric sensing device, where the substrate includes vias positioned above the sensing area. One or more of the vias may be filled with a conductive material. Additionally or alternatively, one or more of the vias may be filled with a dielectric material.

In yet another aspect, a method for providing an electronic device can include providing a biometric sensing device that includes a sensing area, and providing a substrate above the biometric sensing device. The substrate can include vias that are positioned above the sensing area of the biometric sensing device. The vias may be filled with a material that directs the sensed fields to or towards the sensing area. For example, in one embodiment the vias are filled with a conductive material. In other embodiments, the vias may be filled with a dielectric material.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

As described earlier, a substrate that includes one or more vias formed therein may be positioned above a biometric sensing device. The vias can be filled with a material that directs the sensed fields to or towards a sensing area of a biometric sensing device. The sensed fields can be electric fields, magnetic fields, light, heat, and other types of property that can be sensed by a biometric sensing device. For example, the vias may be filled with a conductive material, a non-conductive material, or dielectric material. In some embodiments, a portion of the vias can be filled with a conductive material while another portion is filled with a non-conductive or dielectric material. The material-filled vias shape the sensed fields so that the sensed fields are directed to or towards the sensing area of the biometric sensing device.

Any suitable type of biometric sensing device can be included in or connected to an electronic device. A person's fingerprint, eye, DNA, vein patterns, typing speed or patterns, gait, voice, face, and heart or brain signals are examples of a physical characteristic or a behavioral trait that can be detected or imaged by a biometric sensing device. A biometric sensing device can employ capacitance, ultrasonic, optical, resistive, thermal, or other sensing technologies to detect or image a biometric attribute. The term "biometric attribute"

is meant to encompass a physical or behavioral trait that can be detected by a biometric sensing device.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of a device, the directional terminology is intended to be construed broadly, and therefore should not be interpreted to preclude the presence of one or more intervening layers or other intervening features or elements. Thus, a given layer that is described as being formed, positioned, disposed on, over, or above another layer, or that is described as being formed, positioned, disposed below or under another layer may be separated from the latter layer by one or more additional layers or elements.

Figure 1:
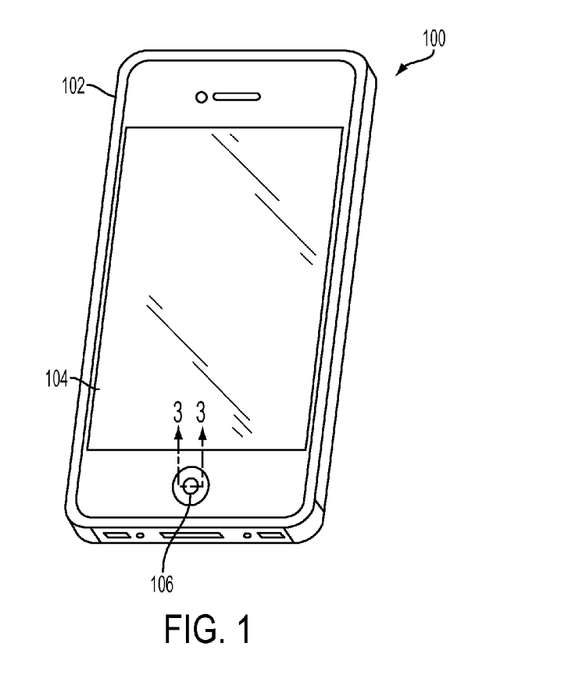
FIG. 1 is a perspective view of one example of an electronic device that can include a biometric sensing device.

Referring now to FIG. 1, there is shown a perspective view of one example of an electronic device that can include a biometric sensing device. In the illustrated embodiment, the electronic device 100 is implemented as a smart telephone. Other embodiments can implement the electronic device differently, such as, for example, as a laptop or desktop computer, a tablet computing device, a gaming device, a display, a digital music player, a wearable communications device, a wearable health assistant, and other types of electronic devices that can acquire biometric data from a biometric sensing device.

The electronic device 100 includes an enclosure 102 at least partially surrounding a display 104 and one or more buttons 106 or input devices. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. The button 106 can take the form of a home button, which may be a mechanical button, a soft button (e.g., a button that does not physically move but still accepts inputs), an icon or image on a display, and so on. Further, in some embodiments, the button 106 can be integrated as part of a cover glass of the electronic device.

One or more biometric sensing devices can be included in, or connected to the electronic device 100. In one embodiment, the button 106 can include a biometric sensing device. As one example, a biometric sensing device can be integrated in the button 106. Additionally or alternatively, a biometric sensing device can be included in a portion of the display, or in the entire display. And in some embodiments, the enclosure 102 can include one or more biometric sensing devices, such as a fingerprint sensing device, a thermal sensing device, and/or a microphone that can be used in conjunction with a voice recognition application.

Figure 2:
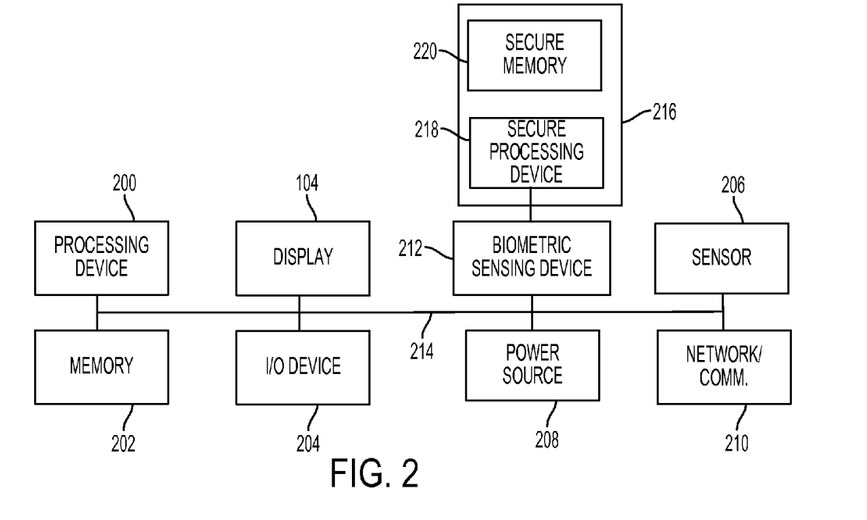
FIG. 2 is an illustrative block diagram of the electronic device 100 shown in FIG. 1.

FIG. 2 is an illustrative block diagram of the electronic device 100 shown in FIG. 1. The electronic device 100 can include the display 104, a processing device 200, memory 202, an input/output (110) device 204, a sensor 206, a power source 208, a network communications interface 210, and a biometric sensing device 212. The display 104 may provide an image or video output for the electronic device 100. The display may also provide an input region for one or more input devices, such as, for example, a touch sensing device and/or a fingerprint sensing device. The display 104 may be substantially any size and may be positioned substantially anywhere on the electronic device 100.

The processing device 200 can control some or all of the operations of the electronic device 100. The processing device 200 can communicate, either directly or indirectly, with substantially all of the components of the electronic device 100. For example, a system bus or signal line 214 or other communication mechanisms can provide communication between the processing device 200, the memory 202, the I/O device 204, the sensor 206, the power source 208, the network communications interface 210, and/or the biometric sensing device 212. The processing device 200 can be implemented as any electronic device capable of processing, receiving, or transmitting data or instructions. For example, the processing device 200 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 202 can store electronic data that can be used by the electronic device 100. For example, a memory can store electrical data or content such as, for example, audio and video files, documents and applications, device settings and user preferences, timing signals, biometric data, data structures or databases, and so on. The memory 202 can be configured as any type of memory. By way of example only, the memory can be implemented as random access memory, read-only memory, Flash memory, removable memory, or other types of storage elements, or combinations of such devices.

The I/O device 204 can transmit and/or receive data to and from a user or another electronic device. One example of an I/O device is button 106 in FIG. 1. The I/O device(s) 204 can include a display, a touch sensing input surface such as a track pad, one or more buttons, one or more microphones or speakers, one or more ports such as a microphone port, and/or a keyboard.

The electronic device 100 may also include one or more sensors 206 positioned substantially anywhere on the electronic device 100. The sensor or sensors 206 may be configured to sense substantially any type of characteristic, such as but not limited to, images, pressure, light, touch, heat, movement, relative motion, and so on. For example, the sensor(s) 208 may be an image sensor, a heat sensor, a light or optical sensor, an accelerometer, a pressure transducer, a gyroscope, a magnet, a health monitoring sensor, and so on.

The power source 208 can be implemented with any device capable of providing energy to the electronic device 100. For example, the power source 208 can be one or more batteries or rechargeable batteries, or a connection cable that connects the remote control device to another power source such as a wall outlet.

The network communication interface 210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

The biometric sensing device 212 can incorporate any suitable sensing technology, including, but not limited to, capacitive, resistive, ultrasound, piezoelectric, and thermal sensing technology. In some embodiments, the biometric sensing device 212 may be connected to a secure processing system 216. The secure processing system can be included in the electronic device, in the biometric sensing device, or in a separate electronic device that is operatively connected to the biometric sensing device 212. The secure processing system 216 can include a secure processing device 218 and a secure memory 220 operatively connected to the secure processing device 218. Any suitable processing device and memory can be used in the secure processing system 216. And in some embodiments, other components can be included in the secure processing system.

The secure processing system 216 can receive biometric data captured by the biometric sensing device. The secure memory 220 may store the captured biometric data, information associated with the biometric data, and reference biometric data. The secure processing device 218 can manipulate the secure data stored in the secure memory, including the biometric data. The processing device 200 can be prohibited from accessing the biometric data received from the biometric sensing device and the secure data stored in the secure memory 220, which increases the security of the secure data. For example, the secure data is inaccessible or less accessible to other programs that may be running on the processing device 200.

It should be noted that FIGS. 1 and 2 are illustrative only. In other examples, an electronic device may include fewer or more components than those shown in FIGS. 1 and 2. For example, some of the components shown in FIG. 2 can be implemented in a separate electronic device that is operatively connected to the electronic device 100 through a wired or wireless connection. As described earlier, the secure processing system can be included in a separate electronic device. Additionally or alternatively, in some embodiments the display or at least one I/O device can be included in a separate electronic device.

Figure 3:
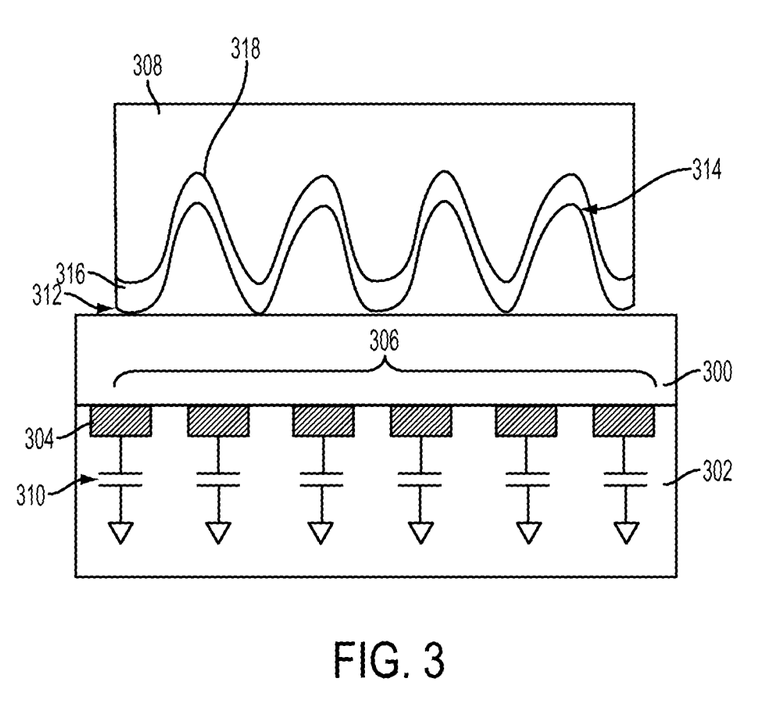
FIG. 3 depicts an enlarged and simplified cross-sectional view of a portion of a fingerprint sensing device taken along line 3-3 in FIG. 1.

As discussed earlier, any suitable type of biometric sensing device can be used. In one embodiment, the biometric sensing device is a capacitive fingerprint sensing device. One example of a fingerprint sensing device and an explanation as to how the capacitive fingerprint sensing device captures a fingerprint image is described briefly. FIG. 3 illustrates an enlarged and simplified cross-sectional view of a portion of a fingerprint sensing device taken along line 3-3 in FIG. 1. A substrate 300 can be disposed above a sensing die 302 that includes one or more electrodes or sensing elements 304. The area of the sensing die 302 that includes the one or more sensing elements 304 forms a sensing area 306 of the fingerprint sensing device.

The sensing die 302 can also include additional circuitry (not shown) that is used to process a fingerprint image. In some embodiments, one or more layers may be positioned between the substrate 300 and the sensing die 302. For example, a color layer can be disposed between the substrate 300 and the sensing die 302 to reduce the visibility of the sensing elements and other circuitry of the fingerprint sensing device.

In some embodiments, the substrate 300 can be used as an exterior surface of a button or other input device (e.g., button 106 in FIG. 1), an exterior surface of an input device such as a track pad or mouse, and/or a cover glass of a display (e.g., display 104 in FIG. 1). As one example, the substrate 300 can be made of a dielectric material, such as sapphire. Some or the all of the top surface of the substrate can be used as an input surface for the fingerprint sensing device. In other words, a user can place his or her finger on or over the top surface of the substrate when one or more fingerprint images is to be captured.

The capacitive fingerprint sensing device can capture a fingerprint image of at least a portion of the finger 308 by measuring the capacitance or capacitance differences (represented by capacitors 310) between the finger 308 and the sensing elements 304. A fingerprint is generally formed from ridges 312 and valleys 314 arranged in a unique pattern. Typically, the capacitance measured between a ridge 312 and one or more sensing elements 304 varies from the capacitance measured between a valley 314 and one or more sensing elements 304. The measured capacitance between a ridge and a sensing element can be greater than the measured capacitance between a valley and a sensing element because the ridge is closer to the sensing element. The differences in the measured capacitances can be used to distinguish between ridges and valleys and produce a fingerprint image.

The skin on the finger 308 includes a dead skin layer 316 disposed over a live skin layer 318. The capacitive fingerprint sensing device typically images the dead skin layer 316 to obtain an image of the fingerprint. However, if a portion of the dead skin layer 316 is damaged or missing, the capacitive fingerprint sensing device can obtain an image of the fingerprint by imaging the live skin layer 318 by itself, or by imaging both the remaining dead skin layer 316 and the exposed live skin layer 318.

Figure 4:
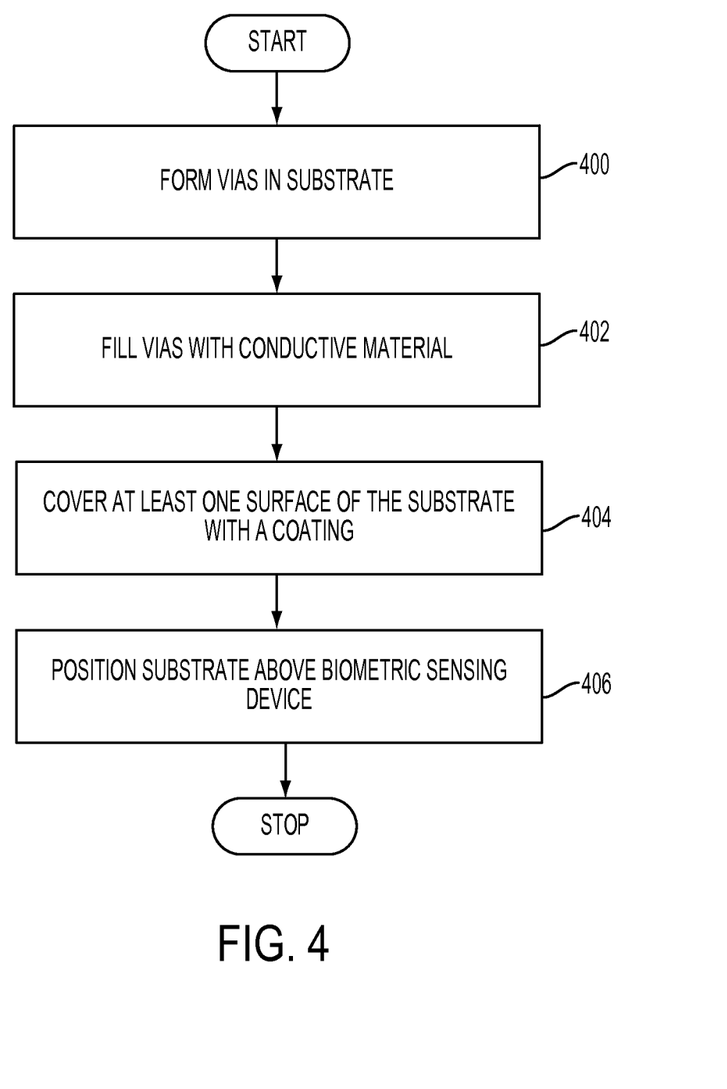
FIG. 4 is a flowchart of a method for forming field shaping channels in a substrate for a biometric sensing device.
Figure 5A:
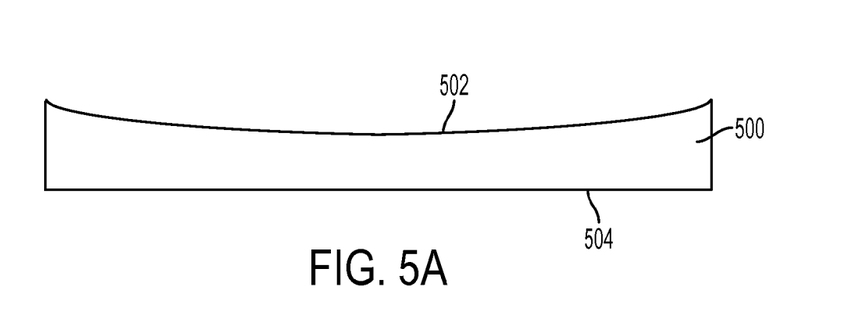
FIGS. 5A-5D illustrate the method shown in FIG. 4 for field shaping channels that are formed through the substrate.
Figure 5B:
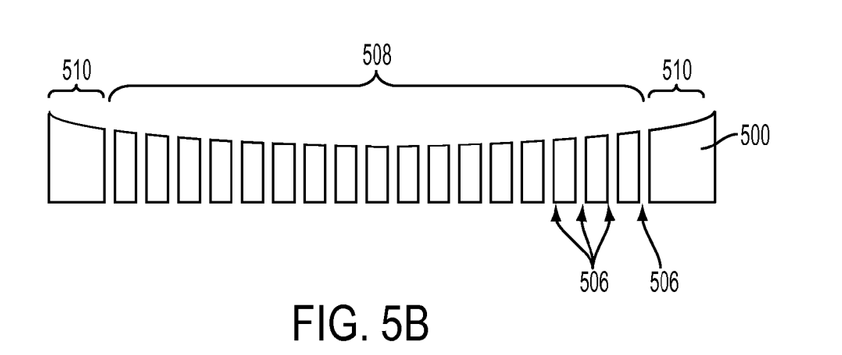

Referring now to FIG. 4, there is shown a flowchart of a method for forming field shaping channels in a substrate for a biometric sensing device. FIG. 4 will be described in conjunction with FIGS. 5A-5D and FIGS. 6A-6D. FIGS. 5A and 6A depict the substrate 500 before the vias are formed. In the illustrated embodiment, the substrate 500 has a flat bottom surface 504 and a curved top surface 502. The curved top surface may be the surface that is used as an input surface for the biometric sensing device, and the bottom surface 504 can be positioned opposite or adjacent to the sensing die. Other embodiments can configure the substrate differently. For example, both the top and bottom surfaces may be flat or curved (e.g., concave) surfaces or at least one surface can be convex.

Figure 6A:
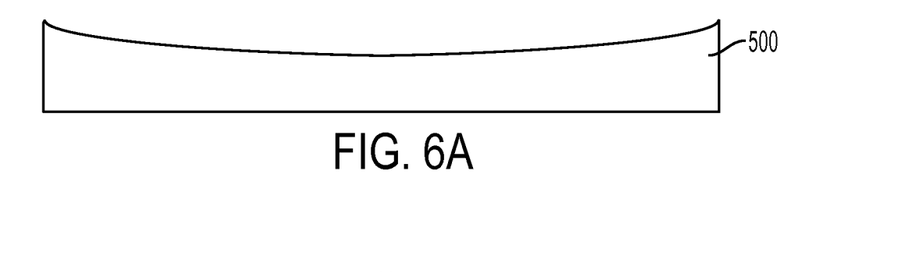
FIGS. 6A-6D illustrate the method shown in FIG. 4 for field shaping channels that are formed only partially through the substrate.
Figure 6B:
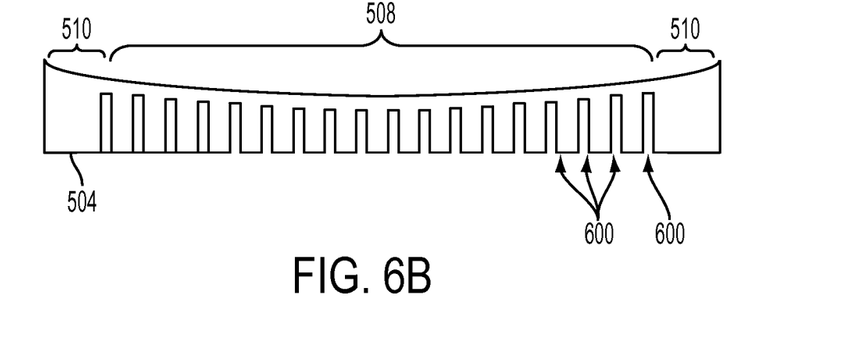

As shown in block 400 of FIG. 4, vias are formed in the substrate. FIG. 5B illustrates vias 506 formed through the substrate 500. The vias extend through the substrate 500 and pass through the top and bottom surfaces 502, 504 of the substrate. The vias 600 in FIG. 6B are formed only partially through the substrate 500. In the FIG. 6B embodiment, the vias 600 pass through the bottom surface 504 of the substrate 500 and extend into the substrate 500, but do not pass through the top surface 502.

In some embodiments, a substrate 500 can include both one or more via regions 508 and one or more non-via regions 510. A via region is an area where the vias are formed in the substrate. At least a portion of a via region can be positioned above a sensing area of the biometric sensing device. A non-via region is an area where vias are not formed in the substrate. A non-via region may be positioned above an area of the sensing die that does not include a sensing area, and/or above an area where the sensing die is not present. For example, the one or more non-via regions can be located in areas where the substrate is attached to a support structure or an enclosure.

In the illustrated embodiment, the vias are substantially vertical in the substrate such that the vias are substantially perpendicular to a top surface of the sensing area and/or of the sensing die. Other embodiments can configure the vias differently. For example, the vias can have one or more different shapes. Additionally or alternatively, the vias can be arranged in a non-vertical configuration.

The vias can be formed in or through the substrate using any suitable method. As one example, the vias may be formed by drilling holes in the substrate with a filament picosecond laser. In some embodiments, the holes can have a diameter of one to three microns, but any suitable diameter can be used. As another example, the vias may be fabricated with deep reactive ion etching. And in a third example, the vias can be formed with an ablation picosecond laser. The type of method used to create the vias can depend on the diameter of the vias, the pitch of the vias, and/or the substrate material.

Figure 5C:
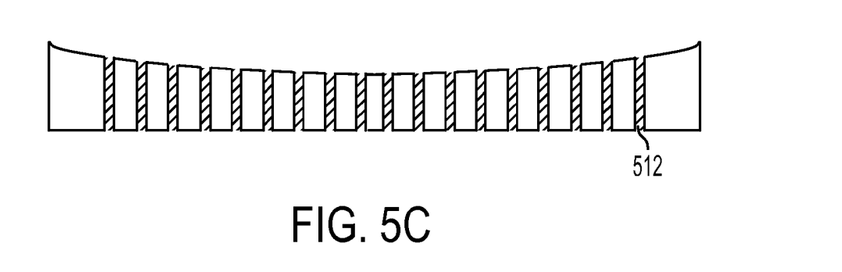
Figure 6C:
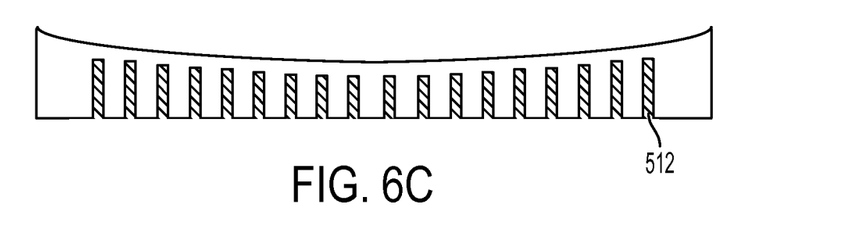

Referring again to FIG. 4, the vias can then be filled with a conductive material at block 402 (see 512 in FIGS. 5C and 6C). Any suitable conductive material can be used. As one example, a substantially transparent conductive material, such as indium tin oxide (ITO), can be plated into the vias. Other embodiments can use a metal, a conductive ceramic, a conductive gel, or other suitable conductive material.

The conductive-filled vias form field shaping channels that may shape or direct the sensed fields when a biometric image is captured. The conductive material can direct the sensed fields into or near the vias, and the vias can direct the sensed fields to or towards the sensing area of the biometric sensing device. Other embodiments can shape the sensed fields differently. As one example, the vias can be filled with a dielectric material that has a higher dielectric constant than the substrate material to direct the sensed fields outside of the vias (i.e., into the substrate around the vias) and towards the sensing area. And in some embodiments, a portion of the vias can be filled with a conductive material and another portion filled with a non-conductive or dielectric material to shape the sensed fields in a desired shape or path(s).

Figure 5D:
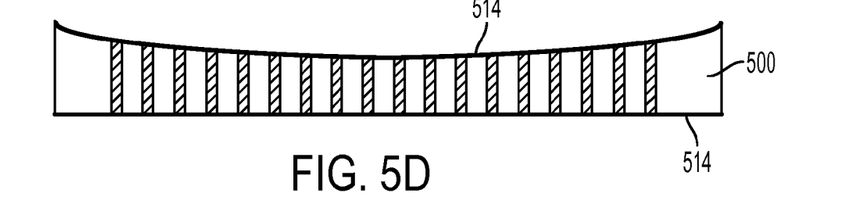
Figure 6D:
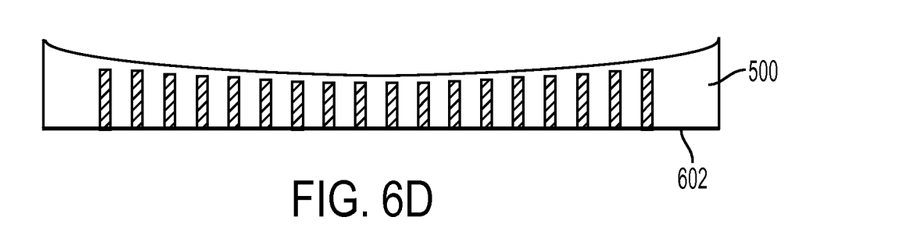

Next, as shown in block 404 of FIG. 4, at least one surface of the substrate can be covered with a coating. For example, in one embodiment, a thin film of aluminum oxide can be deposited over one or more surfaces using a plasma-enhanced chemical vapor deposition process. FIG. 5D depicts a coating 514 formed over the top surface 502 and the bottom surface 504 of the substrate 500, and FIG. 6D illustrates a coating 602 on the bottom surface 504 of the substrate 500.

The substrate can then be positioned above a biometric sensing device, as shown in block 406. In some embodiments, the bottom surface of the biometric sensing device can contact a surface of the biometric sensing device. In other embodiments, a gap can exist between the bottom surface of the substrate and the surface of the biometric sensing device. The gap may or may not be filled with a material.

Figure 7:
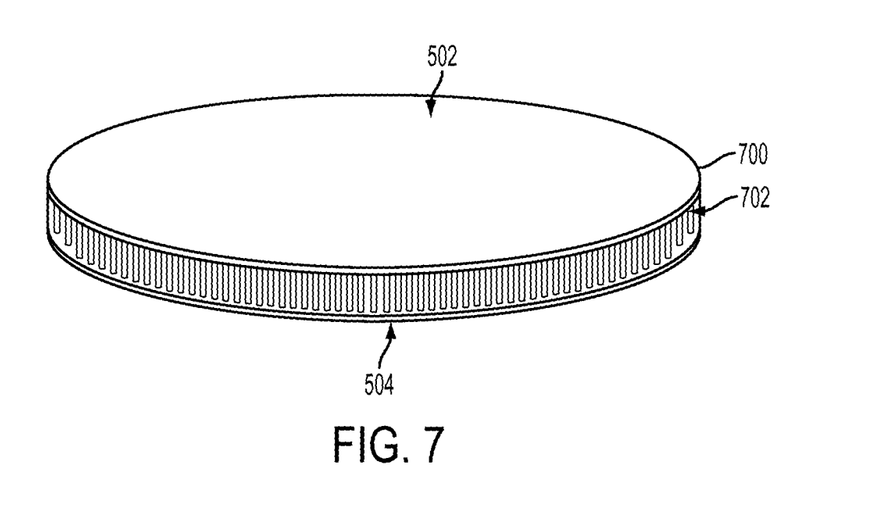
FIG. 7 is a perspective view of a substrate with field shaping channels formed therein.

FIG. 7 is a perspective view of a substrate with field shaping channels formed therein. The field shaping channels 702 can extend through the substrate (but not the coating 700 on the top surface 502 and/or the bottom surface 504). In some embodiments, the field shaping channels can have a pitch that is less than the pitch of the sensing elements in the biometric sensing device. For example, if the sensing elements have a pitch of fifty microns, the field shaping channels have a pitch that is less than fifty microns. If the sensing elements have a pitch of twenty-five microns, the field shaping channels have a pitch that is less than twenty-five microns.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. An electronic device, comprising:
a biometric sensing device comprising a sensing area;
a layer positioned above the sensing area; and
a plurality of vias extending only partially through the layer and comprising a material therein that directs sensed fields towards the sensing area, wherein the vias are positioned above the sensing area of the biometric sensing device.

2. The electronic device as in claim 1, wherein the plurality of vias extend substantially perpendicular to a top surface of the sensing device.

3. The electronic device as in claim 1, wherein the biometric sensing device comprises a fingerprint sensing device.

4. The electronic device as in claim 1, wherein the layer comprises at least one sapphire sub-layer.

5. The electronic device as in claim 1, wherein the material comprises a conductive material.

6. The electronic device as in claim 1, wherein the electronic device comprises a smart telephone.

7. The electronic device as in claim 1, wherein:
the layer defines:
a top surface; and
a bottom surface opposite the top surface; and
the vias extend into the layer from the bottom surface.

8. The electronic device as in claim 1, wherein the vias have a pitch that is less than fifty microns.

9. The electronic device as in claim 1, wherein the vias have a pitch that is less than twenty-five microns.

10. The electronic device as in claim 1, wherein the layer comprises:
a first sub-layer having a plurality of holes therethrough; and
a second sub-layer covering a surface of the first sub-layer.

11. The electronic device as in claim 10, wherein the first sub-layer faces the sensing area of the biometric sensing device.

12. The electronic device as in claim 1, wherein the layer comprises at least two sub-layers of different materials.

13. A fingerprint sensing device, comprising:
a sensing die comprising a plurality of sensing elements that form a sensing area; and
a substrate positioned above the sensing die, comprising:
a first surface;
a second surface opposite the first surface and set apart from the first surface by a distance; and
a plurality of vias extending from the first surface to a depth less than the distance between the first and second surfaces; wherein
at least one via is filled with a conductive material; and
the plurality of vias are arranged substantially perpendicular to a top surface of the sensing area.

14. The fingerprint sensing device as in claim 13, wherein the plurality of sensing elements comprises a plurality of capacitive sensing elements.

15. The fingerprint sensing device as in claim 13, wherein the substrate comprises sapphire.

16. The fingerprint sensing device as in claim 13, wherein the conductive material comprises indium tin oxide.

17. The fingerprint sensing device as in claim 13, wherein the first surface of the substrate is a bottom surface of the substrate.

18. The fingerprint sensing device as in claim 13, wherein the plurality of vias have a pitch less than fifty microns.

19. The fingerprint sensing device as in claim 13, wherein the plurality of vias have a pitch less than twenty-five microns.

20. A method for constructing a biometric sensing device, comprising:
    forming a layer having a plurality of vias extending only partially through the layer;
    filling the vias with a conductive material configured to direct sensed fields towards a sensing area of the biometric sensing device; and
    positioning the layer above the sensing area of the biometric sensing device.

21. The method as in claim 20, wherein forming the plurality of vias comprises:
    forming a plurality of through-holes in a first sub-layer; and
    applying a second sub-layer to at least one surface of the first sub-layer to cover an end of each of the through-holes.

22. The method as in claim 21, wherein applying the second sub-layer to the at least one surface of the first sub-layer comprises depositing a film of aluminum oxide to the at least one surface of the first sub-layer.

23. A method for providing an electronic device, the method comprising:
    forming a plurality of vias in a substrate having a thickness, each via extending from a surface of the substrate to a depth less than the thickness;
    filling the vias with a material having a different dielectric constant than the substrate; and
    placing the substrate above a sensing area of a biometric sensing device;
        wherein the plurality of vias are filled with a material that directs sensed fields towards the sensing area.

24. The method as in claim 23, wherein the operation of forming the plurality of vias comprises drilling the vias with a laser.

25. The method as in claim 23, further comprising covering the surface with a coating after filling the vias with the material.

* * * * *